United States Patent [19]

Takeda et al.

[11] 4,393,449
[45] Jul. 12, 1983

[54] NUMERICALLY CONTROLLED MACHINE TOOL

[75] Inventors: Koichi Takeda, Takarazuka; Yoshiro Sasano, Yawata, both of Japan

[73] Assignees: Daihatsu Motor Co., Ltd.; Matsushita Electric Industrial Co., Ltd., both of Osaka, Japan

[21] Appl. No.: 156,654

[22] Filed: Jun. 5, 1980

[30] Foreign Application Priority Data

Jun. 14, 1979 [JP] Japan .................................. 54-75241
Oct. 2, 1979 [JP] Japan ................................ 54-127594

[51] Int. Cl.³ .......................................... G05B 19/42
[52] U.S. Cl. ...................................... 364/474; 318/568; 364/171; 364/191
[58] Field of Search .............. 364/474, 475, 120, 200, 364/900, 167, 171, 191, 192, 193; 318/568

[56] References Cited

U.S. PATENT DOCUMENTS

| | | | |
|---|---|---|---|
| 3,828,318 | 8/1974 | Bennett et al. | 364/120 X |
| 4,010,356 | 3/1977 | Evans et al. | 364/474 X |
| 4,074,349 | 2/1978 | Ueda | 364/120 X |
| 4,152,765 | 5/1979 | Weber | 364/474 |
| 4,163,284 | 7/1979 | Kishi et al. | 364/474 |
| 4,199,814 | 4/1980 | Rapp et al. | 364/120 X |

*Primary Examiner*—Joseph F. Ruggiero

*Attorney, Agent, or Firm*—Armstrong, Nikaido, Marmelstein & Kubovcik

[57] ABSTRACT

A numerically controlled machine tool is provided which comprises an operation control unit with an operating panel having key switches disposed thereon whereby data on the finish shape and finish dimensions of a workpiece and the machining conditions including spindle rpm and feed rate can be transferred into a control unit. On the basis of this input, the control unit automatically prepares a processing program which decides on the amounts and directions of movement of the tool rest longitudinally and transversely from a reference point which is inherent in the machine and controls the movement in accordance therewith so as to automatically machine the workpiece to the predetermined shape and dimensions. A desired final processing shape may be designated by using function keys on the operating panel bearing words in everyday or conversational language, whereupon the control unit automatically decides what is the data necessary for the particular machining that should be put in and then it turns on guide lamps corresponding to the decided data successively in the order in which the data should be put in, so as to guide the operator. Thus, it is only necessary for the operator to put in specific numerical values by means of ten-keys under the guidance.

3 Claims, 10 Drawing Figures

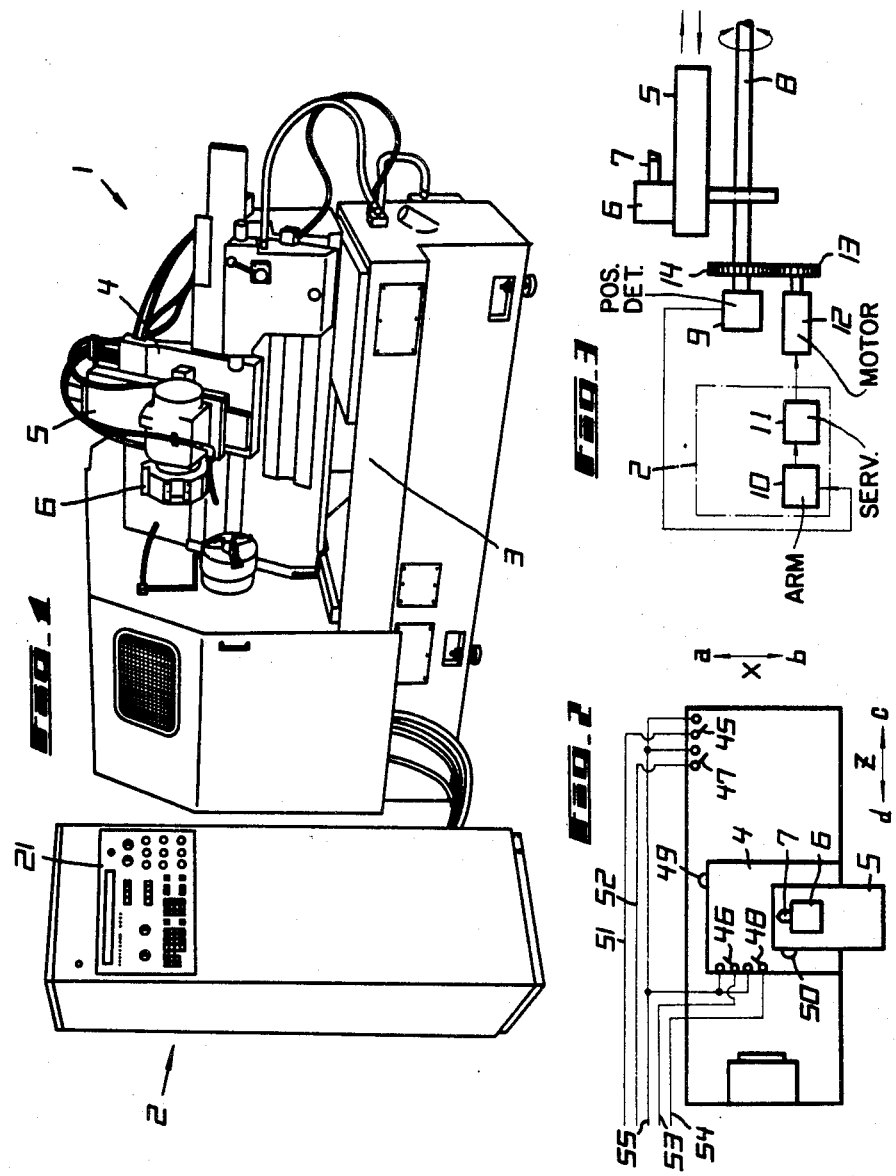

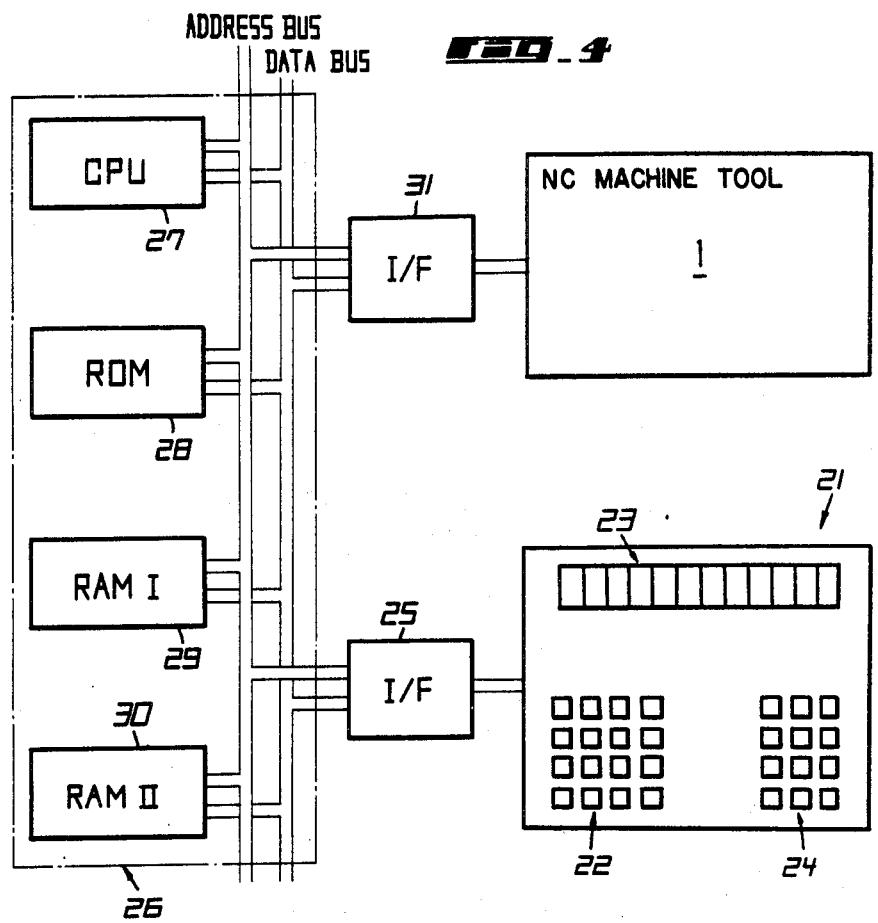
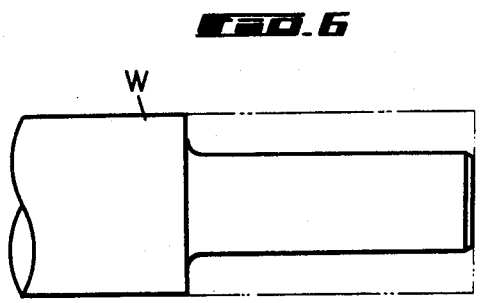

NUMERICALLY CONTROLLED MACHINE TOOL

BACKGROUND OF THE INVENTION

The present invention relates to a numerically controlled machine tool adapted to machine a workpiece to a desired shape by controlling the movement of the position of the tip of a tool from a predetermined processing or machining reference point, in accordance with numerical data.

Conventionally, the numerical control of machine tools has been considered to control them by putting in commands in a coded form of the path to be taken by the tip of the tool during machining. In conventional numerical control wherein as means for putting numerical data into the control section, coded commands are put in by a typewriter or punched tapes having coded commands put therein are used, it is necessary as a matter of course to prepare a program having details of the machining process coded therein, but such preparation of program, as is known, involves much difficulty. Thus, it requires a programmer who has acquired special techniques, and the procedure for preparation of a program comprises the steps of reading the design drawings to decide the necessary process, order of machining, tool to be used, direction of feed, feed rate, quick feed position, cutting feed starting position, amount of machining, spindle rpm, tool exchange command, etc., preparing a coding sheet having this data written thereon in the predetermined order of description by using such automatic programming language as APT or EXAPT, putting data based on said sheet into a computer or an automatic tape preparing machine (very expensive) to prepare an NC tape or manually calculating the tool path necessary for machining, preparing a program sheet having details of the result described therein in NC language in accordance with a given format, and handing it to the key puncher who then prepares a punched tape on the basis of it or operating the operating panel for direct insertion of the data rather than preparing a punched tape having the contents of said program sheet recorded therein. This procedure involves much time and labor. Moreover, since such tape prepared for a particular type of machining can only be used for that machining, there is an inconvenience that if the machining shape is changed even slightly, the tape can no longer be employed as it is.

U.S. Pat. No. 4,033,206 granted to the assignee of the instant application discloses an NC machine tool which requires no such tapes whatsoever and is characterized in that the working modes of cutting tools are classified according to fixed cycles and control information is put into the machine through digital switches. A brief reference will now be made to said patent. Where it is desired to machine a blank to an intended shape, the final shape is a combination of some simple unit or basic forms. In other words, the machining procedure for obtaining the final shape is a combination of some simple basic machining operations, such as outer diameter cutting, inner diameter cutting, facing, tapering and grooving. Although the path of actual movement of the tip of the tool (or the amount and direction of movement of the tool tip) differs with individual machining operations, the movement of the tool tip in each basic machining operation is repetitions of a cycle having a definite characteristic pattern. If, therefore, data on the patternized movement of the tool corresponding to the unit shapes is stored in the memory of the control unit, the setting of a particular basic machining operation can be completed simply by designating the identification sign associated with the basic machining shape by the use of digital switches and then designating the finish dimensions of the associated portion of the workpiece by the use of digital switches. If such settings associated with required different basic machining operations are made in order and the start button is pushed, the machine tool will compute the paths of movement of the tool in the designated order on the basis of the designated finish dimensions according to the respective machining cycles and automatically perform all machining by repeatedly moving the tool until the desired final shape is obtained. In this case, however, the greater the number of machining steps, the greater the number of digital switches required. Another problem is that the manual operation determined by the contents of the process and by the corresponding identification signs can become complicated.

In addition, there is a system called MDI (manual data input) which seems analogous to the above described system in that control data is directly fed into the control unit without using tapes. This system, however, only has the function of a typewriter for preparing tapes and a memory unit for storing the data fed in by the typewriter and, in itself, is no different from a system which directly puts in tapes. Thus, the MDI system requires exactly the same keyboard operation as in the case of preparing a program sheet for the path of movement of the tool and preparing a tape on the basis of said program sheet. It would be much more efficient to have the key puncher prepare tapes at the office than to have the operator feed in the necessary data at the machine shop. Normally, this system is used only for auxiliary purposes, such as correction of tape preparation errors.

Since NC machine tools process work to a desired shape by controlling the amount of movement of the tool tip position from a predetermined machining reference point inherent in the machine, as described above, it is necessary to accurately establish the relative positional relation between the tool tip position and the machining reference point. The usual practice has been to attach the tool to the tool rest by adjusting the tool tip position so that the latter is at the predetermined position fixed as the reference point or to accurately measure the position of the tool tip after the attachment of the tool, feed the measured value into the control section and compute the amount of movement of the tool rest from said position, thereby controlling the movement of the tool rest for machining the workpiece to a desired shape. The amount of movement of the tool tip position is computed and detected by producing pulse signals at the rate of one pulse for every predetermined amount of movement (for example, 0.001 mm) by a rotary position detector installed at the end of a feed screw for the tool rest driven by a servo-motor, or by a linear scale attached to a slide. The distance between the tool tip position and the machining reference point must be permanently stored. For this reason, nonvolatile memory such as core memory is employed or if volatile memory such as semiconductor memory is used, battery support is incorporated to prevent disappearance of the stored data when power is cut off. Even if such measures are taken for the memory to retain the stored data when power is cut off, however, the other circits will stop operating when power is cut off. If, therefore, the tool rest is moved during cutting off of power by some external cause, such as vibrations and external forces, or by reason of inertia in the case of a power breakdown taking place in the course of machining, the amount of movement will not be fed into the memory, so that if machining is restarted under such conditions when power is restored, said accidental movement causes errors. To avoid this, it might be contemplated to battery-support the greater part of the memory to update the contents of the memory by detecting the amount of accidental movement of the tool rest during cutting off of power. However, battery-supporting all the control circuitry would require a very large battery capacity because of high power consumption and would be practically impossible.

SUMMARY OF THE INVENTION

The present invention is intended to solve the above described problems confronted by conventional NC machine tools and has for its principal object the provision of a so-called programmable NC machine tool which does not necessitate using NC tapes or putting in detailed motion commands in NC language and which, instead, includes function keys bearing words in everyday or conversational language, so that when the operator depresses a particular function key or keys which indicate a desired machining form including one or more basic or unit machining shapes, a microcomputer incorporated in the machine automatically decides what is the data necessary for the particular machining that should be put in and then reports the decision by turning on guide lamps corresponding to the decided data successively in the order in which the data should be put in, thereby enabling the operator to put in the numerical data by means of ten-keys in accordance with the report.

To this end, the invention provides an NC machine tool having a control unit which comprises function keys bearing words in conversational language for designating a desired machining form, guide lamps for successively reporting the kinds of data which should be put in, and ten-keys for putting in actual numerical data indicated by design drawings in accordance with the report made through the medium of said guide lamps. With such machine tool, through a push-button operation using conversational language required in order to put in data on desired machining form, finish dimensions and machining conditions, anyone who can read design drawings can operate the NC machine tool. Since there is no need for heretofore used tapes and hence for professional programmer or programmers and it is also unnecessary to prepare coding sheets or program sheets written in exclusive language, a minimum of time is required for preparing a machining program. Moreover, an optimum machining method for executing such program is automatically selected by the control unit, so that there is no possibility of variations in efficiency or in finish quality as have heretofore been caused by programmers.

As described above, since NC machine tools process work to a desired shape by controlling the amount of movement of the tool tip position from a predetermined machining reference point, it is necessary to accurately establish the relative positional relation between the tool tip position and the machining reference point. In this connection, the NC machine tool of the present invention is so designed that once the tool tip position is accurately set when the tool is attached to the tool rest at the commencement of machining, even if power is cut off (and hence the power source for the control unit is cut off) and the tool rest is moved for some reason or other during that time, there is no possibility of producing errors of machining.

More particularly, the NC machine tool includes tool rest arrival detecting means which is attached to a member stationary relative to the movable tool rest and which is adapted to be turned on when contacted by the movable tool rest, and tool rest position detecting means which emits equispaced signals in accordance with the movement of the movable tool rest, the arrangement being such that the position of the tool rest found when the tool rest position detecting means emits a marker signal for the first time after the tool rest arrival detecting means is turned on is determined to be the machining reference point and the movement of the tool rest at the commencement of machining is started at said machining reference point. Thus, if machining is discontinued and power is cut off, the tool rest is once returned to the machining reference point at the restart of machining. Therefore, even if the tool rest was accidentally moved as by external forces during that time, there is no danger of such movement causing errors of machining. Further, since said tool rest position detecting means is of such a nature as is indispensable to all NC machine tools and said tool rest arrival detecting means may be in the form of for example, a limit switch, the arrangement is very simple and inexpensive for its ability to detect the machining reference point with accuracy and is much more advantageous than a system which battery-supports the greater part of the control unit to provide for detection and storage of a possible movement of the tool rest which can take place while power is off.

These and other objects and features of the invention will become more apparent from the following description given with reference to the accompanying drawings.

BRIEF DESCRIPTION OF THE DRAWINGS

FIG. 1 is a perspective view showing the external appearance of an NC lathe to which the present invention is applied;

FIG. 2 is a schematic view showing the principal portion of the lathe shown in FIG. 1;

FIG. 3 is a schematic view of a tool rest position detecting mechanism for the lathe shown in FIG. 2;

FIG. 4 is a block diagram schematically showing the control unit of the lathe shown in FIG. 1;

FIG. 6 is a schematic view of a workpiece, showing an example of a machining form;

DESCRIPTION OF THE PREFERRED EMBODIMENT

Figure 5:
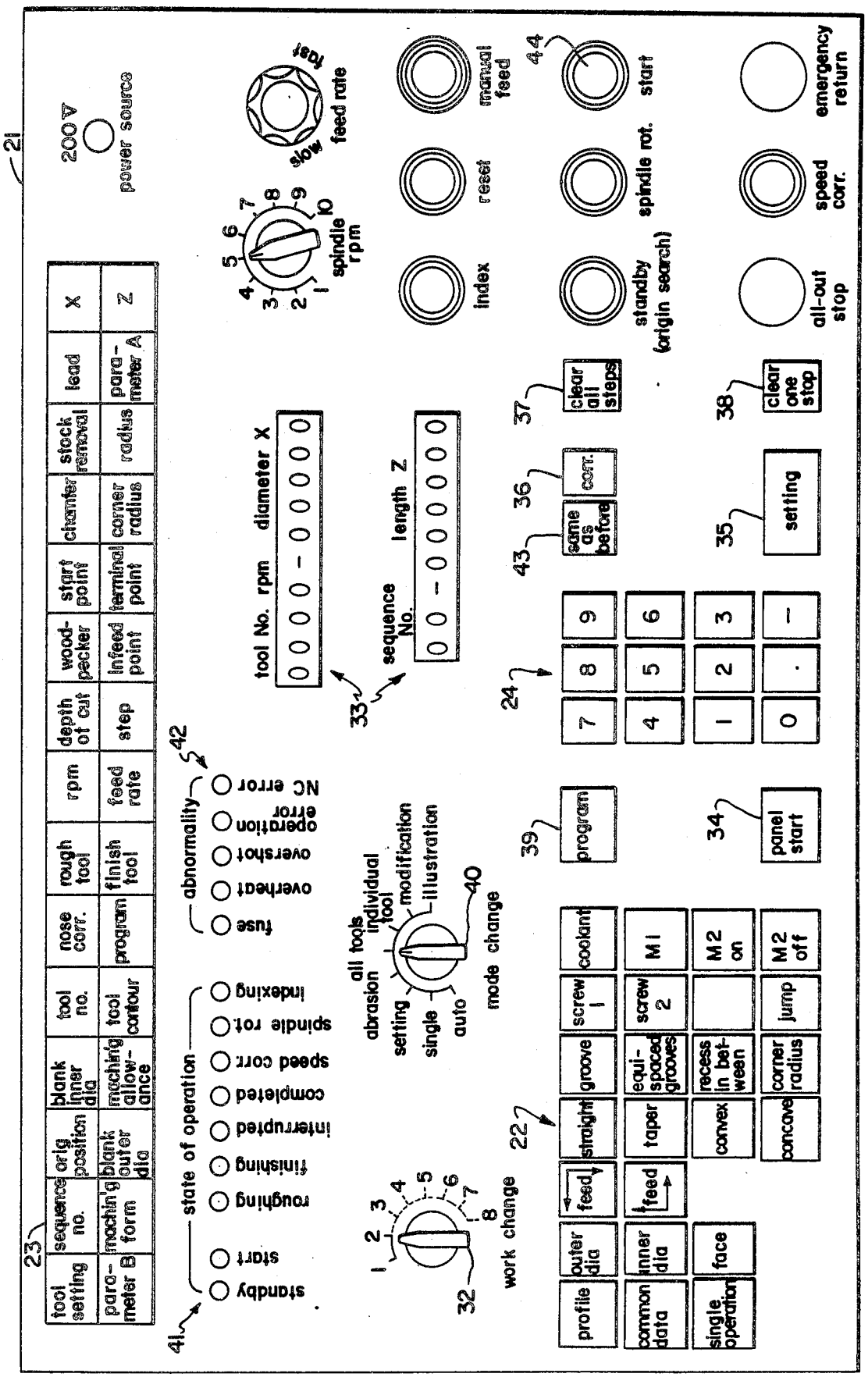
FIG. 5 is an enlarged front view of an operation panel shown in FIGS. 1 and 4.

Referring to FIG. 1, a lathe shown as an example of the NC machine tool of the invention is generally indicated by the numeral 1 and a control unit for the lathe 1 is generally indicated by the numeral 2. As can be best seen in FIG. 2 schematically showing the principal portion of the lathe, the lathe comprises a bed 3, a table 4 slidable on said bed 3 longitudinally of the lathe, namely, in the Z direction, a cross slide 5 slidable on said table 4 transversely of the lathe, namely, in the X direction, and a rotary tool rest 6 attached to said cross slide 5. Although a plurality of tools may be attached to the tool rest 6, only a single tool 7 is shown attached thereto. FIG. 3 schematically shows a mechanism for moving the cross slide 5 on the bed 3 in the X direction. The cross slide 5 is threadedly engaged with a feed screw 8 extending in the X direction and is caused to move back and forth by the rotation of the feed screw 8. A rotary type position detector 9 attached to one end of the feed screw 8 emits equispaced pulse signals in accordance with a predetermined angle of rotation of the feed screw 8. On receiving the signals, the arithmetic section 10 of the control unit 2 performs the necessary calculation to provide an output signal indicating the position of the tip of the tool 7 and feeds the output signal to a servo circuit 11. The servo circuit 11 operates in accordance with signals from the arithmetic section 10 and numerical data put into the control unit 2 in the manner to be later described and indicating how much amount the tool tip should move, so as to control a dc motor 12 which drives the feed screw 8 through gear wheels 13 and 14. In addition, the mechanism for moving the table 4 in the Z direction is substantially the same as described above, so that it is not illustrated in the drawings.

Work is machined to a desired shape by controlling the tool tip position in this way. The control unit which performs such control will now be described.

FIG. 4 schematically shows the control unit of the NC machine tool of the invention, which in this case, is the lathe 1. The control unit 2 comprises an operation panel 21 for the operator to put in data necessary to operate the lathe 1, and a microcomputer 26 connected through a console interface 25 to said operation panel and also connected through a machine tool interface 31 to the lathe 1, which is an object of control. Arranged on the operation panel 21 are function keys 22, guide lamps 23 and ten-keys 24. The function keys 22 serve to designate a machining form, say, a group of unit or basic shapes to be machined by the lathe 1 and bear words written in everyday language, such as "straight", "taper" and "grooving". When a machining form is designated by using the function key or keys 22, the corresponding guide lamps will successively light up to report the operator what items of data are actually required to perform the particular machining. The lamps also bear words written in everyday or conversational language, such as "roughing tool", "rpm" and "depth of cut". The operator has only to read the actual numerical values from the design drawing corresponding to the items demanded by the guide lamps 23 and put them in by means of the ten-keys 24.

The microcomputer 26 comprises CPU 27, ROM 28, RAM I 29 and RAM II 30. The ROM 28 has stored therein in advance data necessary for performing particular types of machining and procedures indicating which data should be put in first. Thus, when a machining form is designated by a function key or keys 22, the ROM operates to successively light the corresponding guide lamps 23 associated with the items concerned in accordance with what is stored therein. The RAM I 29 stores numerical data on various factors, such as tool No., rpm, feed rate, X coordinate of infeed point, Z coordinate of said point, X coordinate of terminal feed point and Z coordinate of said point, put in by the operator using ten-keys 24 under the guidance provided by the guide lamps 23 successively lighted in accordance with the program stored in the ROM 26. The RAM II 30 has stored therein data on the paths of movement of the tool tip during roughing, rough finishing and finishing, respectively, which are described when work is being machined on the lathe and which the CPU 27 provides by performing calculations on the basis of the various data stored in the RAM I 29. In addition, the data stored in the RAM II 30 is updated each time the shape of work to be machined on the lathe 1 changes and hence the data calculated by the CPU 27 on the basis of the data stored in the RAM I 29 changes. If the RAM I 29 has a sufficient memory capacity to stored data necessary to machine various types of work, it becomes unnecessary to update the data stored in the RAM I 29 each time work is changed. More particularly, once data concerning some types of work is stored, it is only necessary to manipulate keys on the operation panel in order to cause the computer to read out data corresponding to desired machining and automatically carry out said machining. The operation of causing the computer to read out data necessary for the particular machining from the data concerning the plurality of work of various shapes stored in the RAM I 29 in advance and perform the machining of the work is initiated by a work change switch 32 (FIG. 5).

The concrete arrangement of the various keys on the operation panel 21 for putting data into the microcomputer 26 is shown by way of example in FIG. 5. This will now be described below.

The respective roles of the function keys 22, guide lamps 23 and ten-keys 24 have been previously described. The function keys 22 are represented in everyday language, as shown. The guide lamps 23 are also represented in everyday language and the representation system employed is a usual one in which when the lamps are lighted, only the letters are illuminated. When numerical values are put in by ten-keys 24, the y appear in an indicating section 33. The numeral 34 denotes a panel start key used to send an operation start signal to the microcomputer 26; 35 denotes a setting key which, after data has been put in by function keys 22 or ten-keys 24, causes the microcomputer 26 to store said data; 36 denotes a correction key used to correct previously set data; 37 denotes an all-machining-step clear key used to clear data concerning all process steps put into the microcomputer; 38 denotes a one-machining-step clear key used to clear data concerning one machining step among the data put into the microcomputer 26; 39 denotes a program key which, after data necessary for machining a type of work to a predetermined shape has been put into the RAM I 29 of the microcomputer 26, causes the CPU 27 to perform various calculations necessary for operating the lathe 1 on the basis of the data in the RAM I 29 and store the resulting data in the RAM II 30; 40 denotes a mode change switch for change of modes, such as manual lathe operation and automatic lathe operation; 41 denotes state indicating lamps which indicate the state of operation of the lathe 1; and 42 denotes abnormality indicating lamps for indicating abnormality if the latter should occur in various associated devices. For example, if function keys 22 are erroneously manipulated to designate any machining form which could not be carried out, an operation error signal will be emitted to indicate abnormality. Suppose that a work is to be machined to a complicated shape through a plurality of unit or basic machining shapes into which the complicated shape is divided and to this end the necessary data for the respective machining steps are put into the microcomputer 26, and that when data for the n th machining step is put in, guide lamps 23 light up to call for the putting in of numerical values for a certain item. If the numerical data to be put in are the same as those put in for the same item in the n-1 th machining step, then it is only necessary to push the key 43 labeled "same as before". Thereupon, the numerical values put in for the corresponding item in the n-1 th machining step are introduced and at the same time said values appear in the indicating section 33. A group of switches shown at right in FIG. 5 are used for manually operating the lathe 1, a description thereof being omitted.

The way of operating the lathe 1 will now be described by taking as an example the case of machining a cylindrical work W shown in FIG. 6 to such shape as indicated in thick lines.

Figure 10:
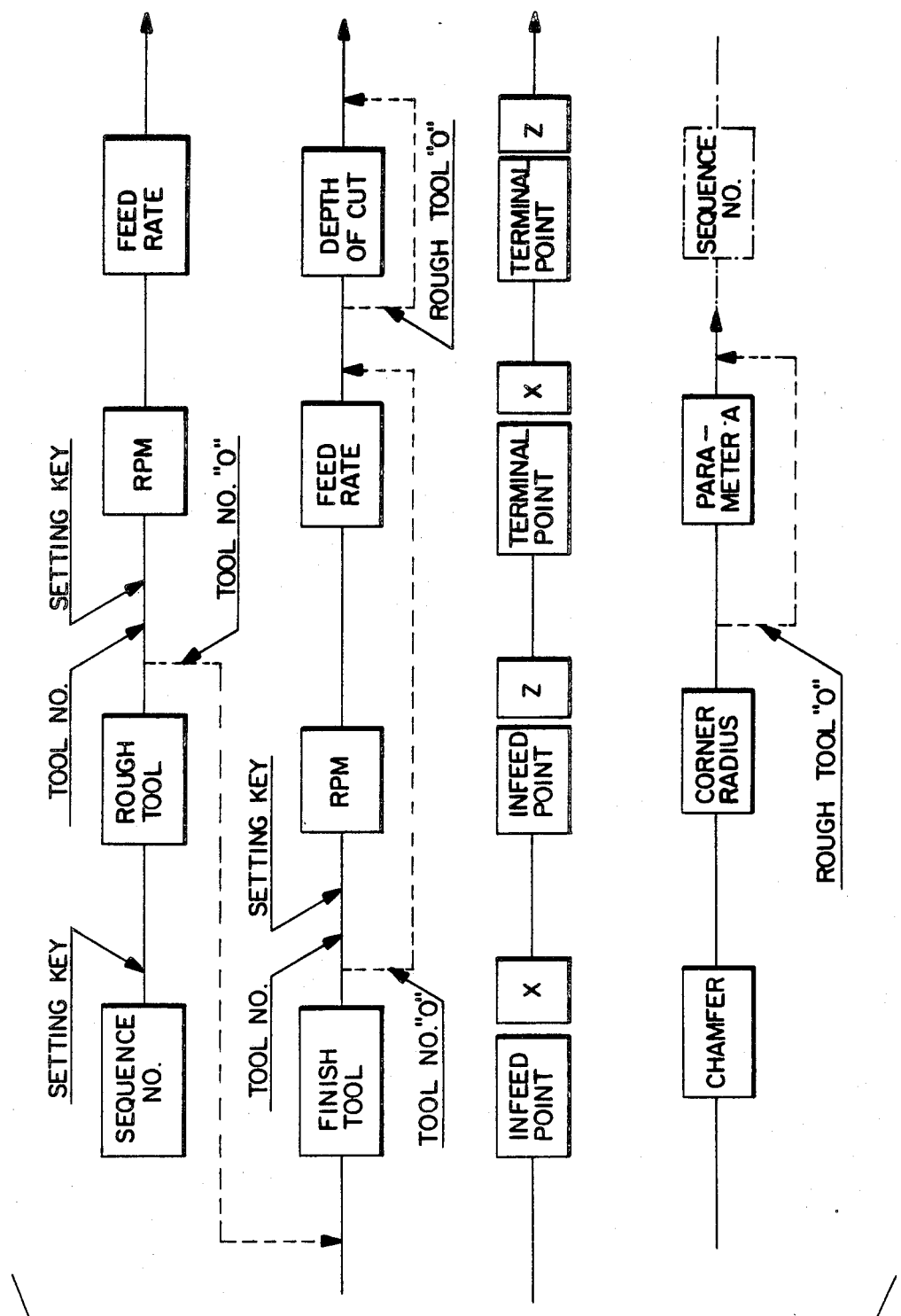
FIG. 10 is a chart showing the data input sequence.

It is seen in FIG. 6 that the outer diameter must be linearly turned. Therefore, of the function keys, those labeled "outer dia.", "straight" and "feed ↓" are pushed to designate the desired machining form. As for the order of pushing these keys, they may be pushed at random. With the machining form thus designated, the microcomputer 26, in accordance with the corresponding program stored in the ROM 28, lights guide lamps 23, commanding the operator to put in numerical values in the order shown in FIG. 10. First, a guide lamp 23 labeled "sequence No." lights up and at the same time sequence No. appears in the indicating section 33. If the operator finds the indicated sequence No. convenient, he pushes the setting key 35 or if he finds it inconvenient, he pushes the correction key 36 and then designates the desired sequence No. by using ten-keys 24 and pushes the setting key 35. Next comes on a guide lamp 23 labeled "roughing tool". The operator selects a tool suitable for the particular machining from the tools attached to the too rest and he puts in the corresponding tool No. by using ten-keys 24. Confirming the indication appearing in the indicating section 33, he pushes the setting key 35. If there is no need of using a roughing tool, "0" may be put in by using a ten key, whereupon the subsequent items "rpm" and "feed rate" are automatically jumped over and a guide lamp 23 for the item "finishing tool" subsequent to the item "feed rate" lights up. Further, if a roughing tool alone is to be used without a finishing tool, "0" may be put in when the guide lamp 23 for the item "finishing tool" lights up, then the subsequent items "rpm" and "feed rate" are automatically jumped over and a guide lamp 23 for the item "depth of cut" subsequent to the item "feed rate" lights up, in a manner analogous to the one described above. In addition, in the case of roughing tool "0", since depth of cut and parameter A are unnecessary, the flow jumps to the next item. In this way, the items of data necessary for carrying out the machining form designated by function keys 22 are reported by guide lamps 23 successively in the order in which they should be put in. Therefore, the operator has only to push the corresponding ten-keys 24 so as to put in the corresponding numerical data for each of the reported items. What is reported last by a guide lamp 23 is an item called "parameter A". In this case, a factor $\lambda$ (usually, $\lambda=1.0$) which indicates a ratio with which the depth of cut is decreased as the diameter of that portion of the work W which is being machined decreases, is given as the parameter A, and this is automatically indicated in the indicating section 33. If the operator finds the indicated value satisfactory, he pushes the setting key 35. If he wants to set $\lambda$ at a value other than 1.0, he pushes the correction key 36 and puts in the desired value by ten-keys 24 and then pushes the setting key 35. In addition, in the case of $\lambda=0.001-0.999$, control is effected such that the remaining work diameter multipled $\lambda/2$ is compared with the input depth of cut and the smaller value is selected as a correct depth of cut. This parameter A introduces dwell time, in sec, (usually 0) at the end of machining in the case of grooving, and in the case of screw cutting, it introduces a thread angle (usually 60°) and such value, if found OK, will be stored in the predetermined place. With this, it follows that a program for one machining step has been put in the computer 26.

When the putting in of all data necessary for machining the work to the designated shape has thus been completed, the microcomputer 26 checks on the input numerical values for errors. In this embodiment, for example, if (infeed point in the Z direction)$\geq$(terminal point in the Z direction) and/or (infeed point in the X direction)$\leq$(terminal point in the X direction), the microcomputer decides the values to be erroneous and indicates an error code. If the results of the check-on is OK, the guide lamp 23 for the item "sequence No." automatically lights up as indicated in phantom lines in the above flow chart and the sequence No. n+1 resulting from adding 1 to the preceding sequence No. n for which the data has already been put in is indicated in the indicating section 33. At this stage, if it is desired to apply further machining, such as screw cutting or grooving, to the work W at the end of its portion to be decreased in diameter, the operator pushes the setting key 35 to designate the sequence No. and after designating the machining form by function keys 22, he pushes the settng key 35. Thereafter, he may put in data under the guidance of guide lamps 23 in the same manner as that described with reference to the first machining step. Alternatively, if it is desired to terminate the machining at this stage, the operator pushes the panel start key 34, whereupon the guide lamp 23 for the item "program" lights up, so that the operator pushes the program key 39. As a result, the CPU 27 of the microcomputer 26 calculates the path of movement of the tool to be taken during roughing and the path of movement of the tool to be taken during finishing, on the basis of the data, such as those described above, stored in the RAM I 29 and puts the results into the RAM II 30 for storage therein. With this, the preparatory operation for machining has been completed. Thus, if the operator pushes the start switch 44 disposed at right on the operation panel 21, the lathe operates under instructions from the microcomputer 26 to machine the work W to the predetermined shape.

In addition, the reason why the path of movement of the tool tip during rough machining is not calculated in advance is that storing all information in the memory unit would require a greatly increased memory capacity. Thus, the paths of movement of the tool tip during complicated finish machining and rough finish machining are calculated in advance and stored in a buffer, while the path of movement of the tool tip during rough machining which requires very simple calculations is given in such a manner that each time the tool reaches the infeed point, the path of movement of the tool tip for the next machining is calculated. This arrangement allows the use of a buffer of very small capacity.

Referring again to FIG. 2, the numeral 45 denotes a limit switch for defining the limit of the movement of the tool rest 6 in the Z-c direction; and 46 denotes a limit switch for defining the limit of the movement of the tool rest 6 in the X-a direction. The numerals 47 and 48 denote limit switches for detecting the arrival of the tool rest in the Z and X directions, respectively. These switches 47, 45, 48, 46 are adapted to be closed by being abutted against by projections 49 and 50 provided on the table 4 and the cross slide 5, respectively. The positions at which the limit switches 47 and 48 are attached may be anywhere respectively on the bed 3 and table 4, which are stationary relative to the tool rest 6, but in order to simplify the construction of the control system, that is, to enable the arrival of the tool rest 6 to be detected by moving the tool rest 6 in one direction, it is preferable to locate said limit switches adjacent the limit switches 45 and 46. The limit switches 47, 45, 48, 46 are connected to the control unit 2 through signal lines 52, 51, 54, 53, and a common ground line 55. The limit switches 47 and 48 can be so designed to when closed, give a decelerating command so as to report that the limits of the movement of the tool rest 6 in the Z-c and X-a directions are near, thereby preventing the tool rest 6 from exceeding the limits under its inertia. In addition, limit switches having the same function as the limit switches 45 and 46 with respect to the movement of the tool rest in the X-b and Z-d directions are provided but they are not illustrated for the sake of brevity.

Figure 7:
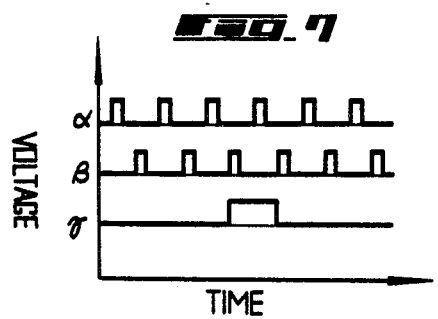
FIG. 7 is an explanatory view of pulse signals from a rotary position detector.
Figure 8:
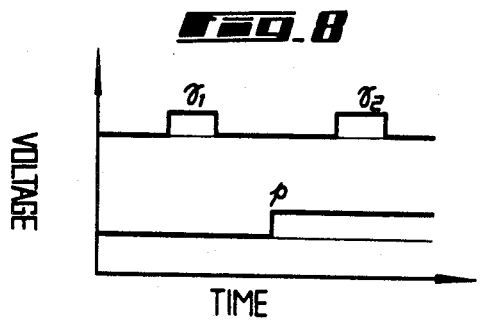
FIG. 8 is a time chart showing the relation between a signal emitted by tool rest arrival detecting means and a signal emitted by tool rest position detecting means.

FIG. 7 shows equispaced pulse signals emitted by the rotary type position detector 9 in accordance with the movement of the tool rest 6. In the case of foreward rotation, signals $\alpha$ are emitted while signals $\beta$ are not emitted. In the case of reverse rotation, the signals $\beta$ are emitted while the signals $\alpha$ are not emitted. The signal $\gamma$ is referred to as marker signal and is emitted for each revolution of the rotary type position detector 9. The positional relation between the signals $\alpha$ and $\beta$ is fixed. By detecting the signals $\alpha$ or $\beta$, it is possible for the control unit 2 to decide which direction and how far the tool rest 6 has moved. As shown in FIG. 8, the rotary type position detector 9 emits the marker signal ($\gamma_1$, $\gamma_2$, ...) for each revolution thereof. When the limit switches 46 and 47 are closed, they put a signal p into the control unit 2. The position of the tool rest 6 found when a marker signal, say $\gamma_2$, is emitted for the first time after the ON-action (signal p) of the limit switch is detected, is fixed as the machining reference point.

The steps of operation are as follows.

(i) Main power source is turned on (or power is restored);

(ii) Operation preparing switch is turned on; (If necessary, the following steps may be controlled by program or relay circuits so that they will be initiated only when the operation preparing switch is turned on for the first time after power is turned on.)

(iii) Tool rest 6 moves in the X-a direction under commands from control unit 2;

(iv) Projection 50 abuts against limit switch 48 which then emits signal p;

(v) Tool rest 6 further moves in the X-a direction and rotary type position detector 9 emits marker signal $\gamma_2$;

(vi) Marker signal $\gamma_2$ is detected and the corresponding position of the tool rest 6 is determined as the machining reference point in the X-direction and $X_1=0$ is stored in memory ($X_1=0$ means that the machining reference point coincides with the absolute origin. $X_1$ is not required to be 0 and may have any value provided that it is a constant.);

(vii) Thereafter, the movement of tool rest 6 in the X-a direction is stopped (The amount of movement of the tool rest during this time is, of course, put into memory on the basis of machining reference point determined in (vi).);

(viii) Similarly, the point for control of the tool rest in the X direction is set.

Figure 9:
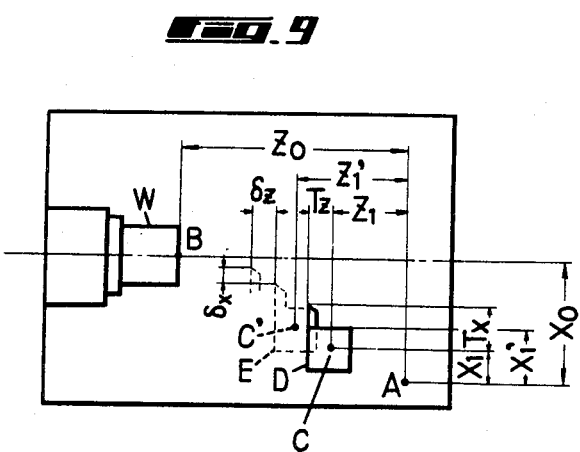
FIG. 9 is an explanatory view of a machining reference point detecting.

The accurate setting of the machining reference point can be effected by the steps (i) through (viii) above. This will become more apparent from the following description given with reference to FIG. 9.

The character A denotes the absolute origin; B denotes the machining origin expressed in terms of coordinates ($Z_o$, $X_o$) from the absolute origin A; C denotes a control point in terms of coordinates ($Z_1$, $X_1$) from the absolute origin A when the tool rest is at a position shown at D; C' denotes a control point expressed in terms of coordinates ($Z_1'$, $X_1'$) from the absolute origin A when the tool rest is at a position shown at E; and T$_z$, T$_x$) is coordinates of the tool tip position from the control point C. Coordinates (Z, X) of the tool tip position from the absolute origin A in the course of the work W being machined to the predetermined shape are as follows:

$$Z = Z_1' + T_z - Z_o \qquad (1)$$

$$X = X_o - (X_1' + T_x) \qquad (2)$$

where $Z_o$, $X_o$, $T_z$ and $T_x$ are constants. The control unit 2 has these equations (1) and (2) stored therein and detects the tool tip position (Z, X) by substitution of changing $Z_1'$ and $X_1'$ values in these equations.

Suppose that a power failed with the tool rest at the position E and that the tool rest has overrun under inertia in the Z and/or X directions by $\delta_z$ and $\delta_x$, respectively. Then, normally, equations (1) and (2) would give the following.

$$Z = Z_1' + T_z + \delta_z = Z_o \qquad (1')$$

$$X = X_o - (X_1' + T_x + \delta_x) \qquad (2')$$

However, since the power source of the control circuitry is cut off because of the power failure, these amounts of movement $\delta_z$ and $\delta_x$ are not put in, so that the memory section still retains the control point C' (the coordinates expressed the equations (1) and (2)) of the tool rest at the point of time immediately before power is turned off, so that the memory section will continue to compute on the basis of the coordinates once power is restored. Therefore, the amounts of movement $\delta_z$ and $\delta_x$ become errors. In such case, therefore, it is necessary to bring the tool rest back to the predetermined machining reference point prior to restart after power is restored. According to the present invention, means for detecting the presence of the tool rest at the position D (machining reference point detecting means) is constituted by a combination of limit switches, such as 47 and 48 described above (tool rest arrival detecting means), and a rotary type position detector 9 (tool rest position detecting means). Thus, when the arrival of the tool rest at said position is detected, the substitutions $X_1' = X$ and $Z_1' = Z$, namely, correction of the control point is effected. In this case, the control point C with the tool rest at the position D is the machining reference point so named herein. As described above, with $X_1 = 0$, the machining reference point coincides with the absolute origin A. The reason for using limit switches in combination with a rotary type position detector for detection of the machining reference point is as follows: Since marker signals $\gamma$ are emitted at equal intervals from the rotary type position detector 9 in accordance with rotation of the latter and in synchronism with rotation of the feed screw 8, there is no positional deviation from the absolute origin A and hence the accuracy of detection of tool rest position is very high, but it is necessary to indicate one of the series of marker signals ($\gamma_1, \gamma_2, \ldots$) so as to represent the machining reference point. It is the limit switches that play this role. The limit switches, which are ON-OFF operated by mechanical action, will cause some error in terms of accuracy of detection, so that the position of the signal P shown in FIG. 8 more or less deviates longitudinally. This deviation is about 1 mm, whereas the spacing of the marker signals ($\gamma_1, \gamma_2, \ldots$) corresponds to the lead of the feed screw 8 (since one marker signal is emitted per revolution) and normally is at least 5 mm. Therefore, detection by the use of limit switches alone is inaccurate. If, however, it is so arranged that the limit switches emit a signal p located intermediate between adjacent marker signals $\gamma_1$ and $\gamma_2$, as shown in FIG. 8, then it follows that an approximate position of the tool rest can be detected by such signal p and that on the basis of such signal p, the marker signal $\gamma_2$ emitted for the first time after emission of the signal p may be used as the detection signal for the machining reference point. Since the position of marker signal $\gamma_2$ is fixed irrespective of the ON-OFF state of the power source, such detection can be effected with accuracy.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A numerically controlled lathe comprising a control means including an operation panel having key switch means arranged thereon, said key switch means inputting data on the finished shape and finished dimensions of a workpiece and on the machining conditions thereof including spindle rpm and feed rate, said control means, on receiving said input data, automatically preparing a machining program; a tool rest means, movable longitudinally and transversely in the lathe with respect to a reference point in the lathe, tool rest arrival detecting means for turning on when said tool rest arrives at predetermined positions located longitudinally and transversely in the lathe and at the same time emitting signals indicating the arrival, and tool rest position detecting means for emitting a series of equispaced signals in accordance with the longitudinal or transverse movement of said tool rest, wherein said machining reference point corresponds to the position of said tool rest when said tool rest position detecting means emits a signal for the first time after said tool rest arrival detecting means has been turned on, said control means controlling the amount and direction of movement of said tool rest means, thereby controlling the lathe to automatically process a workpiece to a desired shape, wherein said control means includes indicating means for indicating in conversational language, the kinds and sequence of numerical values to be inputted into and control means, and said key switch means includes function keys for designating a shape to be machined, and numerical keys for inputting specific numerical values in accordance with the output of said indicating means.

2. A numerically controlled lathe as set forth in claim 1, wherein said tool rest arrival detecting means comprises stationary members positioned adjacent said tool rest and limit switches attached to members, said members being stationary with respect to said movable tool rest.

3. A numerically controlled lathe as set forth in claim 1, wherein said tool rest includes a feed screw for moving said tool rest, and said tool rest position detecting means comprises a rotary type position detector for emitting a series of equispaced signals in accordance with the rotation of said feed screw of said tool rest.

* * * * *